Patented Oct. 24, 1939

2,177,530

UNITED STATES PATENT OFFICE 2,177,530

PROCESS FOR THE TREATMENT OF ABIETYL COMPOUNDS AND PRODUCTS PRODUCED THEREBY

Edwin R. Littmann, Wilmington, Del., assignor to Hercules Powder Company, Wilmington, Del., a corporation of Delaware No Drawing. Original application June 12, 1936, Serial No. 84,877. Divided and this application September 9, 1936, Serial No. 100,041

12 Claims. (Cl. 260—666)

This invention relates to a process for the treatment of rosin, rosin acids, and compounds derived from rosin which contain the hydrocarbon nucleus characteristic of rosin acids, and to the products thereof. More specifically, this invention relates to the treatment of such compounds, so as to decrease their unsaturated characteristics, and to the products resulting from such treatment.

This treatment in accordance with this invention comprises essentially contacting rosin, a rosin acid, or other compound containing the hydrocarbon nucleus of a rosin acid with a catalyst of the type hereinafter described, in a manner to exclude the possibility of reaction between the rosin or rosin derivative and any added material capable of reducing the unsaturation of the rosin acid nucleus. As a result of such treatment a change in the chemical and physical properties of the rosin or rosin derivative takes place, and the resultant product will be found to have a greatly decreased unsaturation. In many cases, the product will also be found to have a higher melting point and improved properties. These changes in the physical and chemical characteristics of the material are believed to be due to an intra- and inter-molecular rearrangement of the hydrogen atoms occurring therein, with no change in the carbon skeleton.

The catalysts which may be used in effecting this change are those which catalyze the hydrogenation of unsaturated organic compounds, as, for example, nickel, copper chromite, platinum, palladium, etc. While both base and noble metal hydrogenation catalysts are useful in producing this change or intra- and inter-molecular rearrangement, a catalyst of a noble metal supported on an inert carrier is particularly effective. Palladium in an amount within the range of about 1% to about 25% supported on an inert carrier, such as, for example, granular alumina or fibrous asbestos, is preferred.

A novel type of palladium catalyst, devised especially for the process in accordance with this invention, may be made as follows:

A solution containing 1 part by weight of palladium chloride, 2 parts by weight of concentrated hydrochloric acid and 8 parts by weight of water is adsorbed on 15 parts by weight of granular alumina. This mixture is then treated with 2 parts by weight of an approximately 37% formaldehyde solution, followed with approximately 15 parts by weight of an approximately 10% sodium hydroxide solution, enough to make the solution slightly alkaline and precipitate the palladium black. After thorough agitation, the mixture is filtered, washed with water, dilute acetic acid, and then again with water, until neutral. The product is then finally dried in an oven at 80° C. to 100° C. This catalyst is most efficient in the treatment in accordance with this invention and its use is preferred.

Rosin is a mixture of isomeric rosin acids having the formula $C_{19}H_{29}COOH$, in which the group $C_{19}H_{29}$ has been shown to contain two double bonds and to possess an alkylated phenanthrene nucleus. It will be understood that when reference is made herein to a rosin acid, a carboxylic acid found in rosin and containing the group $C_{19}H_{29}$, is meant. More than fifty different isomeric rosin acids have been reported in the literature. The best known of these acids are abietic acid, sapinic acid and d-pimaric acid. The relative proportions in which these and the other isomeric rosin acids occur in a given sample of rosin depends on the source of the rosin. Thus, wood rosin contains more abietic acid than any of the other acids, while American gum rosin contains more sapinic acid. French gum rosin contains more d-pimaric acid.

The hydrocarbon nucleus of each of these isomeric acids is capable of reaction in accordance with this invention, and for the purposes of this invention they are entirely equivalent. Thus, for example, any of the various grades of American wood rosin, American gum rosin, French gum rosin, Portuguese gum rosin, Spanish gum rosin etc., may be treated to reduce their unsaturated characteristic. The several isomeric acids found in various types of rosin, for example, abietic acid, d-pimaric acid, sapinic acid, etc., may be separated and treated in purified form if desired. Likewise, compounds derived from rosin or the rosin acids without alteration of the $C_{19}H_{29}$ nucleus are equivalent to the rosin or rosin acids for the purposes of this invention. Further, partially hydrogenated rosins and compounds containing a partially hydrogenated hydrocarbon nucleus of a rosin acid are still further reduced in unsaturation when treated by the process in accordance with this invention and are likewise equivalent to the unhydrogenated compounds from the standpoint of this invention. Such compounds are characterized by containing somewhere in their structure the hydrocarbon group $C_{19}H_{31}$ containing one double bond, and are present in any hydrogenated rosin or rosin acid, less than 100% saturated with hydrogen, to an extent determined largely by the degree of saturation.

The class of compounds which may be treated in accordance with the process of this invention to decrease their unsaturation and improve their properties are characterized by containing somewhere in their structure an alkylated phenanthrene group containing two double bonds and having the formula $C_{19}H_{29}$ or a partially hydrogenated phenanthrene group containing one double bond and having the formula $C_{19}H_{31}$. No generic term has developed in the literature to cover this closely related group of compounds, so for convenience I will term them "Rosinyl compounds". The term "Rosinyl compound" will hereinafter be understood to include the abietyl compounds, the similar groups of compounds derived from rosin acids isomeric with abietic acid, partially hydrogenated abietyl compounds, and the similar partially hydrogenated compounds derived from rosin acids isomeric with abietic acid. This term is not intended to include rosins or compounds derived from rosins which have been hydrogenated sufficiently to remove both double bonds or to include compounds derived from rosin by a process which materially alters the hydrocarbon skeleton of the rosin acid.

In addition to the various rosins, rosin acids, partially hydrogenated rosins, and partially hydrogenated rosin acids mentioned hereinbefore, there are many other "Rosinyl" compounds which may be treated in accordance with this invention. Thus, for example, I may treat the monohydric and polyhydric alcohol esters of rosins, rosin acids, partially hydrogenated rosins, or partially hydrogenated rosin acids, such as, for example, their esters with methanol, ethanol, propanol, iso-propanol, butanol, iso-butanol, oleyl alcohol, lauryl alcohol, abietyl alcohol, hydroabietyl alcohol, furfuryl alcohol, tetra-hydrofurfuryl alcohol, ethylene glycol, diethylene glycol, triethylene glycol, glycerol, erythritol, pentaerythritol, surbitol, mannitol, mixtures thereof, phenol, etc. I may treat alcohols produced from rosins and rosin acids, partially hydrogenated rosins, or partially hydrogenated rosin acids, by the reduction of the carboxyl groups of the rosin acids, such as, for example, abietyl alcohol, dihydroabietyl alcohol, sapinyl alcohol, dihydrosapinyl alcohol, pimaryl alcohol, dihydropimaryl alcohol, etc. Again, I may treat ethers formed by the etherification of the alcohols derived from rosins, rosin acids, partially hydrogenated rosins, and partially hydrogenated rosins acids with aliphatic, aromatic, or hydroaromatic alcohols, such as, for example, abietyl methyl ether, abietyl ethyl ether, abietyl butyl ether, abietyl phenyl ether, abietyl bornyl ether, abietyl terpinyl ether, primaryl methyl ether, pimaryl ethyl ether, pimaryl propyl ether, pimaryl phenyl ether, pimaryl bornyl ether, pimaryl terpinyl ether, sapinyl methyl ether, sapinyl ethyl ether, sapinyl propyl ether, sapinyl butyl ether, sapinyl phenyl ether, sapinyl bornyl ether, sapinyl terpinyl ether, etc. Likewise, I may treat hydrocarbons produced by the decarboxylation of rosins, rosin acids, partially hydrogenated rosins, partially hydrogenated rosins acids, etc., such as, for example, those produced by the treatment of rosins, rosin acids, partially hydrogenated rosins and partially hydrogenated rosin acids with a catalyst, as, p-toluene sulphonic acid, at an elevated temperature, according to the process disclosed in United States Patent 1,975,211, to Alan C. Johnston, or by treatment with fuller's earth at an elevated temperature.

Compounds which contain in their structure a rosin acid nucleus or partially hydrogenated rosin acid nucleus which has undergone the intra- and inter-molecular rearrangement produced by the process in accordance with this invention, will hereinafter be referred to as "Hyex" compounds. The catalytic reaction by which the unsaturation of the rosin acid nucleus or the partially hydrogenated rosin acid nucleus is reduced will be termed the "Hyex reaction."

In carrying out the process in accordance with this invention, the "Rosinyl" compound will be brought into contact with a hydrogenation catalyst, preferably at an elevated temperature in order that a practical reaction rate may be obtained; however, the use of an elevated temperature is not necessary for the accomplishment of the desired result. The optimum temperature range for most satisfactory results is from about 150° C. to about 250° C., and a temperature of about 220° C. to about 250° C. is preferred. Pressure has little or no effect on the reaction, which may be carried out in vacuo or at superatmospheric pressure if desired. Since atmospheric pressure is most convenient from an apparatus standpoint, such will usually be used.

As thorough contact between catalyst and rosin or rosin acid can best be obtained when the "Rosinyl" compound or partially hydrogenated "Rosinyl" compound is in liquid or vapor phase, the "Rosinyl" compound or partially hydrogenated "Rosinyl" compound will preferably be heated to render it sufficiently fluid for desired contact with the catalyst. While, under certain circumstances it is desirable to carry out the reaction in the vapor phase, ordinarily I prefer to carry it out with a liquid phase. The "Rosinyl" compound or the partially hydrogenated "Rosinyl" compound may be in the molten condition or may, if desired, be dissolved in a suitable inert, non-reactive solvent, and the solution so formed treated with a hydrogenation catalyst. Any solvent for the compound treated which is not a poison to a hydrogenation catalyst and which does not contain catalyst poisons as impurities and which does not enter into the Hyex reaction is suitable for this purpose. Thus, for example, aliphatic hydrocarbons, the various petroleum fractions, monocyclic aromatic hydrocarbons, hydrogenated aromatic hydrocarbons, etc., are suitable for the purpose. The aliphatic hydrocarbons and the various petroleum fractions are particularly useful.

In accordance with this invention it is essential that the treatment of the "Rosinyl" compound be carried out in such a manner that no reaction can occur between the compound being treated and any added material capable of reducing its unsaturation under the conditions of reaction. In other words, any material which, under the conditions of treatment, will react with the "Rosinyl" compound to reduce its unsaturation must be excluded. No added hydrogen is present during the treatment. However, inert substances and substances capable of reaction with the compound which do not reduce its unsaturation, may be present. Thus, inert solvents, inert gases, etc., may be present. While the treatment may be carried out in the presence of air, it is preferable to treat the "Rosinyl" compound or the partially hydrogenated "Rosinyl" compound in an atmosphere of a more inert gas, as, for example, carbon dioxide, nitrogen, etc.

The treatment in accordance with this invention may be carried out simultaneously with other reactions, which do not involve a change in the unsaturated characteristic of the rosin nucleus.

Thus, rosin or a rosin acid may be treated with a hydrogenation catalyst to produce an intra- and inter-molecular rearrangement of the nucleus and, for example, simultaneously esterified with an alcohol, to produce a rosin ester of reduced unsaturation.

Contact between the "Rosinyl" compound or the partially hydrogenated "Rosinyl" compound and the catalyst should be maintained for from a few seconds to 5 hours or more, depending upon the temperature and upon the amount and activity of the catalyst employed. Upon the completion of the treatment, the resultant product may be easily separated from the catalyst by filtration. The product secured after the removal of the catalyst, if volatile, may if desired, be distilled under reduced pressure and separated into two or more fractions. Where a high melting point product is desired, such may be secured by the removal of the low-boiling fraction from the catalytically-treated material.

The product, in accordance with this invention, may be produced by one or more of the three alternate embodiments of the method in accordance with this invention. By the first of these alternate embodiments the corresponding "Rosinyl" compound may be treated, either alone or in solution, with a suitable catalyst to produce the Hyex reaction, as described hereinbefore. This embodiment will be most advantageous for the treatment of rosin compounds which are free from impurities which will poison the catalyst, or which are not of such nature that they act as catalyst poisons. Thus, rosin may be contacted with a catalyst to produce a Hyex rosin, or a rosin ester may be passed over a catalyst to produce a Hyex rosin ester.

By a second embodiment of the method in accordance with this invention a "Rosinyl" compound may be treated with a suitable catalyst to produce the Hyex reaction, and simultaneously reacted, either alone or in the presence of a solvent, with some other material which is incapable of affecting the unsaturation of the rosin acid or partially hydrogenated rosin acid nucleus or of poisoning the hydrogenation catalyst. Thus, a mixture of wood rosin and methanol may be treated with a suitable catalyst at an elevated temperature and pressure to produce a Hyex methyl abietate, which is identical in properties with the product secured by subjecting methyl abietate to the Hyex reaction.

By a third embodiment of the method in accordance with this invention a "Rosinyl" compound may be treated, either alone or in solution, with a suitable catalyst to produce the Hyex reaction and the product so formed reacted with another material to produce the desired product. Thus, for example, any of the different rosins may be contacted with a suitable catalyst, as hereinbefore described, to produce a Hyex rosin, and then esterified by reaction with an alcohol to produce the Hyex rosin ester and the Hyex rosin ester so produced will be identical in properties with the Hyex rosin ester produced according to the first or second embodiments of my invention.

A wide variety of Hyex compounds may be prepared by this embodiment of my invention. Thus, any one of the rosins, rosin acids, or partially hydrogenated rosins mentioned above may be subjected to the Hyex reaction, and then decarboxylated as, for example, by heating in contact with fuller's earth or a sulphonic acid catalyst to produce a Hyex rosin oil. A rosin or rosin ester may be subjected to Hyex treatment and then reduced to the corresponding alcohol, as for example, by hydrogenation of the acid, or reduction of the ester with sodium and alcohol. The alcohol so produced may then be etherified with another alcohol, such as, for example, one of the aliphatic, aromatic, or hydroaromatic alcohols mentioned hereinbefore. Alternately, a rosin acid may be reduced to the corresponding alcohol, as for example, by catalytic treatment with hydrogen and the product subjected to the Hyex reaction and then etherified.

This third embodiment of my invention is particularly useful for the production of Hyex compounds which cannot be easily produced by the first or second alternative methods, due to the corresponding "Rosinyl" compound or partially hydrogenated "Rosinyl" compound being of a nature such that it acts as a poison to the catalyst in the Hyex reaction. Thus, for example, many of the metallic salts of rosin acids, or partially hydrogenated rosin acids have a tendency to poison the catalyst or to contain catalyst poisons unless proper precautionary measures are taken and, hence, cause difficulty in the Hyex reaction. Hyex rosin salts, however, may be readily prepared by subjecting a rosin acid or a partially hydrogenated rosin acid to the Hyex reaction and then forming the salt of the Hyex rosin acid produced. Thus, any one of the rosins, rosin acids, or partially hydrogenated rosins mentioned above may be subjected to the Hyex reaction and then reacted with a metallic hydroxide or other metallic compound, capable of forming a metallic salt with the Hyex rosin acid. Thus, the Hyex rosin acid may be reacted with an alkali metal hydroxide, for example, sodium or potassium hydroxide, to produce the corresponding alkali metal salt of the Hyex rosin or with a heavy metal oxide or hydroxide, as for example, lead, cobalt, or manganese hydroxide, to produce the corresponding heavy metal salts.

The product in accordance with this invention, is a compound which contains somewhere in its structure a hydrocarbon group derived from an isomeric rosin acid, which has undergone what appears to be an intra- and inter-molecular rearrangement to eliminate its unsaturation as measured by the Wijis iodine value or the thiocyanate value. Such compounds may, for example, be of one of the following types: carboxylic acid, ester, alcohol, ether, hydrocarbon, metallic salt, etc. These compounds will be found to resemble, in general physical appearance, the compounds which have not been treated by the method in accordance with this invention, although frequently they are lighter in color and have a higher melting point than the corresponding untreated product. Chemically the treated and untreated compounds are identical with respect to the functional group, but different in regard to their chemical unsaturation.

Due to the substantially saturated character of the products prepared in accordance with this invention, their use will be found to be highly advantageous in many products in which untreated "Rosinyl" compounds are now used. Thus, Hyex rosin, Hyex rosin acids, Hyex rosin ethers, etc. will be found advantageous for use in paints, varnishes and lacquers, in place of the corresponding "Rosinyl" compounds which have been used before. The Hyex rosin oils, because of their stability to oxidation, will be found useful as thread lubricants in spinning operations, as high boiling solvents for gums and resins, and as ingredients in greases. The alkali metal salts of the Hyex rosins are useful as paper size and soaps, and are advantageous in this use due to their resistance to chemical oxidation and as intermediates for additional syntheses. The heavy metal salts of Hyex rosin, such as, for example, those containing manganese, cobalt, zinc, lead, etc., are particularly useful as driers in paints and varnishes, since solutions containing such driers remain bright and of constant drying strength on aging.

The carboxylic acids included within the scope of this invention are the isomeric rosin acids, or commercial mixtures thereof in the various types of rosins, mentioned hereinbefore, which have been subjected to the Hyex treatment. The esters, in accordance with this invention, are compounds having the following formula:

R—COO—A in which R is a hydrocarbon nucleus of one of the isomeric rosin acids, which has been subjected to the Hyex treatment either before, during, or after the esterification reaction and A is a group derived from an alcohol. The ethers, in accordance with this invention, are compounds having the following formula: R—CH$_2$—O—A in which the R and A have the same meaning as in the formula given for the esters. The hydrocarbons, in accordance with this invention are the hydrocarbon nuclei of the isomeric rosin acids which have been subjected to the Hyex treatment and from which the carboxyl group has been removed. Such Hyex "Rosinyl" hydrocarbons may be produced by subjecting rosin or a rosin acid to the Hyex treatment and then treating the resulting Hyex rosin or Hyex rosin acid to remove the carboxyl group. Alternately the rosin or rosin acid may be decarboxylated, by treatment with a sulfonic acid catalyst or any other reagent known to produce the decarboxylation of rosin, and the resulting hydrocarbon then subjected to the Hyex treatment. The salts, in accordance with this invention, are metal salts of a Hyex rosin or Hyex rosin acid. Such salts will desirably be produced by subjecting the rosin or rosin acid to the Hyex treatment and then forming the salt by reaction with a suitable metal compound, such as, for example, the metal hydroxide. Alternately, but less desirable, the rosin or rosin acid may be treated with a suitable metal compound to form the salt, and this salt then subjected to the Hyex treatment.

The following table shows comparative values of various chemical constants for rosin which has been subjected to the Hyex reaction together with those of the corresponding untreated rosin.

TABLE I

|  | "I" wood rosin (before treatment) | Hyex "I" wood rosin |
|---|---|---|
| Thiocyanate No. | 90–96 | 10–14. |
| Melting point (drop) °C. | 80–85 | 85–90. |
| Color | | Very slight bleaching produced by reaction. |
| Saponification No. | 168–172 | 167–171. |
| Oxygen absorption (percent of total absorbed by two double bonds) percent | 40 | 1. |

The decrease in thiocyanate number and in oxygen absorption exhibited by the treated "I" wood rosin is proof of the marked decrease in chemical unsaturation produced by treatment in accordance with this invention. The fact that the saponification number is practically the same for both the treated and untreated rosins demonstrates that the carboxyl groups of the rosin acids have been unchanged by the treatment, which must therefore affect the hydrocarbon nucleus only.

The following table shows comparative values of various chemical constants for a treated, together with those of the corresponding untreated, rosin acid.

TABLE II

|  | Abietic acid (before treatment) | Hyex abietic acid |
|---|---|---|
| Thiocyanate No. | 90–93 | 15–55. |
| Melting point | 145°–150° C. | 160°–165° C. |
| Color (when melted) | Pale straw | Practically colorless. |
| Oxygen absorption (percent of total absorbed by two double bonds) | 55% | None. |

Here, as in the case of "I" rosin, the lowered thiocyanate number and oxygen absorption demonstrates the saturated character of the treated abietic acid.

EXAMPLE I

*Preparation of Hyex rosins and Hyex rosin acids*

Samples of French gum rosin, dihydroabietic acid (50% saturation), recrystallized dihydroabietic acid (50% saturation), "FF" grade wood rosin, and "G" grade American gum rosin, respectively, were contacted with a catalyst of palladium supported on alumina, which was prepared as described hereinbefore, for a period of one hour at a temperature of 230° C., under conditions such that no compound capable of reducing unsaturation came in contact with the rosin treated. The physical and chemical characteristics of each of these rosins were altered by this treatment, as shown by the comparison of the properties of the treated and untreated samples given in the following table:

TABLE III

*Analyses of Hyex rosins*

| Rosin treated | Thiocyanate No. | | Melting point (drop) | | Specific rotation | |
|---|---|---|---|---|---|---|
|  | Untreated | Treated | Untreated | Treated | Untreated | Treated |
|  |  |  | ° C. | ° C. |  |  |
| French gum rosin | 100 | 24 | 92 | 99 | +15.9 | Cryst. |
| Dihydroabietic acid (50% sat.) | 40 | 5 | 77 | 87 | +27.3 | +53.5 |
| Dihydroabietic acid (recryst.) | 21 | 4 |  | 89 | +43.2 | +51.1 |
| "FF" wood rosin | 99 | 80 | 86 | 83 |  |  |
| "G" American gum rosin | 94 | 8 | 90 | 95 |  |  |

These data demonstrate that the treatment of each of the rosins and rosin acids listed, by the process in accordance with this invention, makes substantial reduction in their unsaturation, as shown by the decrease in the thiocyanate number, and substantially increases the melting point.

EXAMPLE II

*Preparation of Hyex wood rosin in solution*

A mixture of 25 parts by weight of "I" wood rosin, 10 parts by weight of the palladium catalyst supported on granular alumina described hereinbefore, and 25 parts by weight of decane was placed in a bomb and heated to a temperature of 235° C. and a pressure of 75 lbs. per sq. in. for one hour. At the end of this period, the product was filtered and the treated rosin recovered from the decane solution by evaporating the decane under atmospheric and finally under reduced pressure. Comparative analyses of this product and of the original "I" wood rosin are given in Table IV.

TABLE IV

|  | "I" wood rosin (untreated) | Treated "I" wood rosin |
|---|---|---|
| Thiocyanate value | 93 | 16 |
| Acid number | 169 | 159 |

The data given in the above table demonstrate that the treatment of a solution of "I" wood rosin in decane, in accordance with this invention, produces a marked decrease in the unsaturation of the "I" wood rosin, as measured by the thiocyanate value, with a relatively unimportant decrease in acidity, as measured by the acid number.

EXAMPLE III

*Preparation of Hyex wood rosin oil*

Four hundred g. of the Hyex wood rosin described in Table I was heated to 285° C. with 1/10 of 1% by weight of paratoluene sulfonic acid. The temperature was then raised to 320° C., and maintained at this point for 4 hours. This treatment produced 390 g. of a crude rosin oil having an acid number of 58 as compared with an acid number of 160 for the original Hyex wood rosin. Substantially neutral oil was then produced by dissolving 150 g. of this crude oil in 200 g. of petroleum ether, washing this solution with an aqueous caustic soda solution, and evaporating the petroleum ether. Ninety-seven g. of an oil having the following analyses was obtained:

Acid number_____ 1.0
Refractive index at 20° C_____ 1.5475
Thiocyanate value_____ 40.5

A second portion of the crude rosin oil was purified by an alternative procedure as follows:

Fifteen g. of sodium carbonate and 25 g. of water were added to 150 g. of the crude oil. When the reaction was complete the mixture was heated and the water evaporated. This product was then distilled under reduced pressure to give 80 g. of a pale rosin oil as a distillate. This pale rosin oil gave the following analyses:

Acid number_____ 0.75
Refractive index at 20° C_____ 1.5543
Thiocyanate value_____ 31.5

EXAMPLE IV

*Preparation of Hyex gum rosin oil*

Crude rosin oil was prepared from a Hyex American gum rosin similar in properties to that described in Table III, by following the same procedure given in Example III for the preparation of the crude Hyex wood rosin oil. From 400 g. of the Hyex gum rosin there was obtained 375 g. of a crude rosin oil which gave the following analyses:

Acid number_____ 9.0
Refractive index at 20° C_____ 1.5543
Thiocyanate value_____ 31.5

An essentially neutral rosin oil was obtained from this crude rosin oil by the following procedure: A mixture of 180 g. of the crude rosin oil in 200 g. of petroleum ether was washed with an excess of an aqueous solution of sodium hydroxide. The rosin oil was then recovered by separating the non-aqueous portion of the wash mixture and evaporating the solvent. The product was a substantially neutral Hyex American gum rosin oil which gave the following analyses:

Acid number_____ 1.5
Refractive index at 20° C_____ 1.5537
Thiocyanate value_____ 28

A second method by which the crude Hyex gum rosin oil was purified was as follows: 180 g. of the crude rosin oil was distilled under reduced pressure from excess sodium carbonate to yield 128 g. of a pale colored Hyex American gum rosin oil which gave the following analyses:

Acid number_____ 1.0
Refractive index at 20° C_____ 1.5517
Thiocyanate value_____ 28.0

It will be understood that the details and examples hereinbefore set forth are illustrative only, and that the invention as herein broadly described and claimed is in no way limited thereby.

It will be understood that the term "unsaturation" is used in this specification and in the appended claims to refer to the unsatisfied carbon valences of the type represented by a double bond in unsaturated aliphatic compounds and conveniently measured by the thiocyanate value.

This application is a division of my application for United States Letters Patent, Serial No. 84,877, filed June 12, 1936, which is in turn a continuation-in-part of my application for United States Letters Patent, Serial No. 6,403, filed February 13, 1935.

What I claim and desire to protect by Letters Patent is:

1. The method of treating a hydrocarbon derived by decarboxylation of a material from the group consisting of rosin, partially hydrogenated rosin, rosin acids, and partially hydrogenated rosin acids which includes contacting the hydrocarbon in the liquid phase with an active hydrogenation catalyst under conditions of reaction adapted to produce an intra- and inter-molecular rearrangement of hydrogen atoms in the hydrocarbon and in the absence of added substances capable of reducing the unsaturation of the hydrocarbon.

2. The method of treating a hydrocarbon derived by decarboxylation of a material from the group consisting of rosin, partially hydrogenated rosin, rosin acids, and partially hydrogenated rosin acids which includes heating the hydrocarbon in the liquid phase with an active hydrogenation catalyst under conditions of reaction adapted to produce an intra- and inter-molecular rearrangement of hydrogen atoms in the hydrocarbon and in the absence of added substances capable of reducing the unsaturation of the hydrocarbon.

3. The method of treating a hydrocarbon derived by decarboxylation of a material from the group consisting of rosin, partially hydrogenated rosin, rosin acids, and partially hydrogenated rosin acids which includes heating the hydrocarbon with an active hydrogenation catalyst at a temperature of from about 150° C. to about 250° C. in the absence of added substances capable of reducing the unsaturation of the hydrocarbon.

4. The method of treating a hydrocarbon derived by decarboxylation of a material from the group consisting of rosin, partially hydrogenated rosin, rosin acids, and partially hydrogenated rosin acids which includes contacting the hydrocarbon in the liquid phase with a noble metal hydrogenation catalyst under conditions of reaction adapted to produce an intra- and inter-molecular rearrangement of hydrogen atoms in the hydrocarbon and in the absence of added substances capable of reducing the unsaturation of the hydrocarbon.

5. The method of treating a hydrocarbon derived by decarboxylation of a material from the group consisting of rosin, partially hydrogenated rosin, rosin acids, and partially hydrogenated rosin acids which includes contacting the hydrocarbon in the liquid phase with a base metal catalyst under conditions of reaction adapted to produce an intra- and inter-molecular rearrangement of hydrogen atoms in the hydrocarbon and in the absence of added substances capable of reducing the unsaturation of the hydrocarbon.

6. The method of treating a hydrocarbon derived by recarboxylation of a material from the group consisting of rosin, partially hydrogenated rosin, rosin acids, and partially hydrogenated rosin acids which includes contacting the hydrocarbon in the liquid phase with a palladium catalyst under conditions of reaction adapted to produce an intra- and inter-molecular rearrangement of hydrogen atoms in the hydrocarbon and in the absence of added substances capable of reducing the unsaturation of the hydrocarbon.

7. The method of treating a hydrocarbon derived by decarboxylation of a material from the group consisting of rosin, partially hydrogenated rosin, rosin acids, and partially hydrogenated rosin acids which includes contacting the hydrocarbon in the liquid phase with a catalyst comprising palladium black supported on granular alumina under conditions of reaction adapted to produce an intra- and inter-molecular rearrangement of hydrogen atoms in the hydrocarbon and in the absence of added substances capable of reducing the unsaturation of the hydrocarbon.

8. The method of treating a hydrocarbon derived by decarboxylation of a material from the group consisting of rosin, partially hydrogenated rosin, rosin acids, and partially hydrogenated rosin acids which includes contacting the hydrocarbon in the liquid phase with an active hydrogenation catalyst at a temperature within the range of from about 220° C. to about 250° C. in the absence of added substances capable of reducing the unsaturation of the hydrocarbon.

9. As a new composition of matter, a liquid rearrangement product of rosin oil, said product possessing substantially the same empirical formula as rosin oil and characterized by a substantial resistance to oxidation and a substantial reduction in apparent unsaturation as compared with rosin oil, said product having a thiocyanate value not in excess of about 41.

10. As a new composition of matter, a liquid rearrangement product of wood rosin oil, said product possessing substantially the same empirical formula as wood rosin oil and characterized by a substantial resistance to oxidation and a substantial reduction in apparent unsaturation as compared with wood rosin oil, said product having a thiocyanate value not in excess of about 41.

11. As a new composition of matter, a liquid rearrangement product of French gum rosin oil, said product possessing substantially the same empirical formula as French gum rosin oil and characterized by a substantial resistance to oxidation and a substantial reduction in apparent unsaturation as compared with French gum rosin oil, said product having a thiocyanate value not in excess of about 41.

12. As a new composition of matter, a liquid rearrangement product of American gum rosin oil, said product possessing substantially the same empirical formula as American gum rosin oil and characterized by a substantial resistance to oxidation and a substantial reduction in apparent unsaturation as compared with American gum rosin oil, said product having a thiocyanate value not in excess of about 41.

EDWIN R. LITTMANN.